(12) United States Patent
Honda et al.

(10) Patent No.: US 10,605,583 B2
(45) Date of Patent: Mar. 31, 2020

(54) DRIVE CONTROL METHOD OF DRIVE STAGE DEVICE

(71) Applicant: MITUTOYO CORPORATION, Kanagawa (JP)

(72) Inventors: Hiroomi Honda, Miyazaki (JP); Toshihiro Kanematsu, Miyazaki (JP)

(73) Assignee: MITUTOYO CORPORATION, Kanagawa (JP)

(*) Notice: Subject to any disclaimer, the term of this patent is extended or adjusted under 35 U.S.C. 154(b) by 184 days.

(21) Appl. No.: 15/955,078

(22) Filed: Apr. 17, 2018

(65) Prior Publication Data

US 2018/0299247 A1    Oct. 18, 2018

(30) Foreign Application Priority Data

Apr. 18, 2017    (JP) ................. 2017-081986

(51) Int. Cl.
| | |
|---|---|
| *G01B 5/008* | (2006.01) |
| *G01B 5/20* | (2006.01) |
| *G01G 19/08* | (2006.01) |
| *G01B 5/00* | (2006.01) |
| *G01B 5/06* | (2006.01) |
| *G01G 5/02* | (2006.01) |

(52) U.S. Cl.
CPC .......... *G01B 5/201* (2013.01); *G01B 5/0004* (2013.01); *G01B 5/008* (2013.01); *G01B 5/061* (2013.01); *G01G 5/02* (2013.01); *G01G 19/083* (2013.01)

(58) Field of Classification Search
CPC ... G01B 5/0004; G01B 5/0011; G01B 5/0016
USPC ............................................. 33/503
See application file for complete search history.

(56) References Cited

U.S. PATENT DOCUMENTS

| | | | | |
|---|---|---|---|---|
| 6,065,220 A | * | 5/2000 | Ohtsuka ................. | G01B 5/016 33/542 |
| 6,655,672 B2 | | 12/2003 | Tsuruta | |
| 6,745,616 B1 | * | 6/2004 | Katayama ............ | G01B 5/0004 33/551 |
| 2014/0317942 A1 | * | 10/2014 | Sagemueller ........ | G01B 21/042 33/503 |
| 2016/0040987 A1 | * | 2/2016 | Bernhardt .............. | G01B 21/04 33/503 |
| 2016/0131470 A1 | * | 5/2016 | Ishikawa .............. | G01B 21/045 33/503 |

(Continued)

FOREIGN PATENT DOCUMENTS

JP    3949910 B2    4/2007

*Primary Examiner* — George B Bennett
(74) *Attorney, Agent, or Firm* — Greenblum & Bernstein, P.L.C.

(57) ABSTRACT

In a control method of a drive stage device, a stage is floated on an air bearing, then a height of the stage while floating on the air bearing is measured as a first height. A work piece is placed on the stage and a height of the stage while holding the work piece is measured as a second height. A difference between the first height and the second height is calculated as a drop amount, and a weight of the work piece is calculated based on the drop amount. An upper limit speed of one of rotational drive and horizontal movement of the stage is determined based on the calculated work piece weight. A speed of the one of the rotational drive and the horizontal movement of the stage is controlled so as to not exceed the upper limit speed.

12 Claims, 11 Drawing Sheets

(56) References Cited

U.S. PATENT DOCUMENTS

2016/0195389 A1* 7/2016 Sagemueller ........ G01B 21/045
33/503
2019/0346246 A1* 11/2019 Beinemann .......... G01B 21/047

* cited by examiner

DRIVE CONTROL METHOD OF DRIVE STAGE DEVICE

CROSS-REFERENCE TO RELATED APPLICATIONS

The present application claims priority under 35 U.S.C. § 119 of Japanese Application No. 2017-081986, filed on Apr. 18, 2017, the disclosure of which is expressly incorporated by reference herein in its entirety.

BACKGROUND OF THE INVENTION

1. Field of the Invention

The present invention relates to a drive control method of a drive stage device and, as an example, relates to a drive control method of a rotary table.

2. Description of Related Art

A roundness measuring device is a known example of a shape measuring device (Japanese Patent No. 3,949,910). The roundness measuring device includes a rotation mechanism and closely measures changes in the radius of a measured object (hereafter referred to as "work piece") having a round shape. The measurement accuracy of the roundness measuring device is closely related to the rotation accuracy of a rotary table.

Any aberration in the rotation of the rotary table will, of course, degrade the shape measurement results. Accordingly, a maximum load capacity at which rotation accuracy can be guaranteed is defined for the rotary table. When the rotary table is driven while holding a work piece that exceeds the load capacity, the rotation accuracy naturally cannot be guaranteed, and such operation may damage internal mechanisms of the rotary table. However, mistaken operation does frequently occur in which a work piece exceeding the load capacity is measured by the roundness measuring device.

In addition, rotation control of a rotary table already employs control that anticipates a maximum-load work piece. Specifically, in order to preserve rotation accuracy even when the weight of the work piece is the maximum load capacity, control is performed such that the rotary table accelerates slowly, a maximum rotation speed is set sufficiently low, and the rotary table also decelerates and stops slowly. Identical control is applied even when the work piece is lightweight. Therefore, an amount of time for measurement takes longer than necessary when the work piece is lightweight, but this solution remains indispensable for preventing damage to the rotary table.

An example using a rotary table is described, but the challenge described above is not limited to "rotation" and is shared with a movable stage that displaces while an object rests atop the stage.

A rotary table device rotating a rotary table about a rotation axis as a center of rotation and a movable stage device moving a movable stage in one or two dimensional directions are referred to generically as a drive stage device.

SUMMARY OF THE INVENTION

An advantage of the present invention is to provide a control method of a drive stage device that is capable of achieving drive control appropriate to a weight or the like of an object resting on a stage of the device.

A control method of a drive stage device according to an aspect of the present invention includes: causing a stage to float on an air bearing; measuring, as a first height, a height of the stage while floating on the air bearing; placing a work piece on the stage; measuring, as a second height, a height of the stage when the stage is holding the work piece; calculating, as a drop amount, a difference between the first height and the second height; calculating a weight of the work piece based on the drop amount; determining an upper limit speed of one of rotational drive and horizontal movement of the stage based on the calculated work piece weight; and controlling a speed of the one of the rotational drive and the horizontal movement of the stage so as to not exceed the upper limit speed.

A control method of a drive stage device according to another aspect of the present invention includes: causing a stage to float on an air bearing; measuring, as a first height, a height of the stage while floating on the air bearing; placing a work piece on the stage; measuring, as a second height, a height of the stage when the stage is carrying the work piece; calculating, as a drop amount, a difference between the first height and the second height; calculating a weight of the work piece based on the drop amount; determining one of an acceleration speed limit and a deceleration speed limit of one of rotational drive and horizontal movement of the stage based on the calculated work piece weight; and controlling the one of the acceleration speed and the deceleration speed of the one of the rotational drive and the horizontal movement of the stage so as to not exceed the limit.

According to another aspect of the present invention, preferably, the calculated weight of the work piece is compared with a maximum load capacity of the drive stage device, and when the calculated weight of the work piece exceeds the maximum load capacity, a user is notified.

A control method of a shape measuring device according to another aspect of the present invention is a control method of a shape measuring device provided with a rotary table device having a rotary table that rotates while carrying a work piece, and a coordinate measurer detecting a surface of the work piece and measuring a shape of the work piece, the control method including: causing the rotary table to float on an air bearing; measuring, as a first height, a height of the rotary table while floating on the air bearing; placing the work piece on the rotary table; measuring, as a second height, a height of the rotary table when the rotary table is carrying the work piece; calculating, as a drop amount, a difference between the first height and the second height; calculating a weight of the work piece based on the drop amount; determining an upper limit of a rotation speed of the rotary table based on the calculated work piece weight; and measuring, with the coordinate measurer, the shape of the work piece resting on the rotary table while controlling the rotation speed of the rotary table so as to not exceed the upper limit.

A control method of a shape measuring device according to another aspect of the present invention is a control method of a shape measuring device provided with a rotary table device having a rotary table that rotates while carrying a work piece, and a coordinate measurer detecting a surface of the work piece and measuring a shape of the work piece, the control method including: causing the rotary table to float on an air bearing; measuring, as a first height, a height of the rotary table while floating on the air bearing; placing the work piece on the rotary table; measuring, as a second height, a height of the rotary table when the rotary table is carrying the work piece; calculating, as a drop amount, a difference between the first height and the second height; calculating a weight of the work piece based on the drop amount; determining one of an acceleration speed limit and a deceleration speed limit of rotation of the rotary table based on the calculated work piece weight; and measuring, with the coordinate measurer, the shape of the work piece resting on the rotary table while controlling the one of the acceleration speed and the deceleration speed of the rotation of the rotary table so as to not exceed the limit.

According to another aspect of the present invention, preferably, a moment of inertia of the work piece is calculated based on a diameter and a weight of the work piece, and the upper limit of the rotation speed of the rotary table is determined based on the moment of inertia of the work piece.

According to another aspect of the present invention, preferably, a moment of inertia of the work piece is calculated based on a diameter and a weight of the work piece, and the limit of the one of the acceleration speed and the deceleration speed of the rotation of the rotary table is determined based on the moment of inertia of the work piece.

According to another aspect of the present invention, preferably, centering of the rotary table device is performed after measuring the second height.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
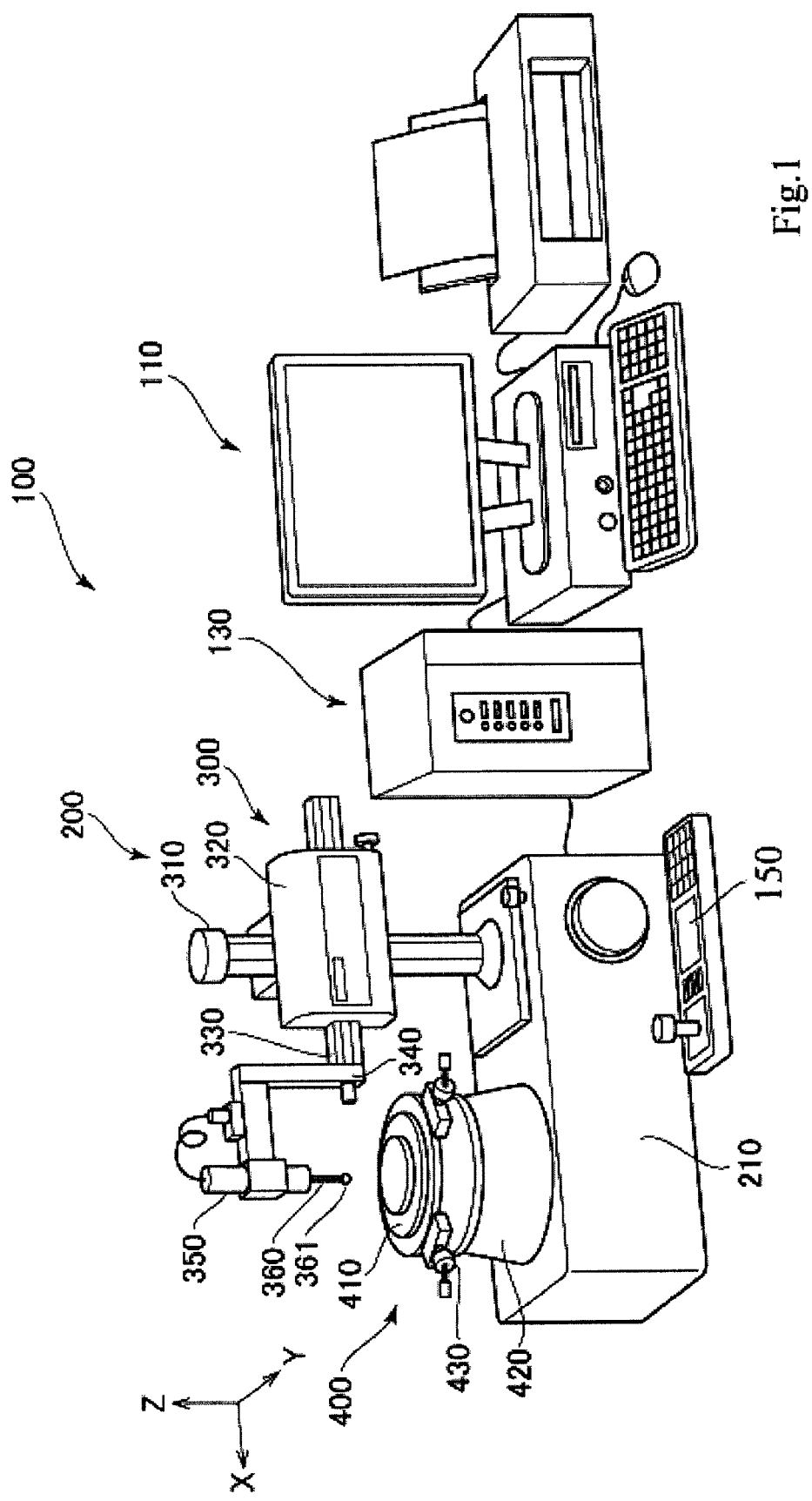
FIG. 1 is an external view of a roundness measuring device.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A description of an embodiment of the present invention is given with reference to the drawings and to the reference numerals assigned to each component in the drawings.

First Embodiment

FIG. 1 is an external view of a roundness measuring device. A roundness measuring device 100 includes a measurer main body 200, a motion controller 130, a host computer 110, and a console 150.

The measurer main body 200 includes a stand 210, a coordinate measurer 300, and a rotary table device 400.

The coordinate measurer 300 includes a Z axis column 310, a Z slider 320, an X arm 330, a head holder 340, and a probe head 350. The Z axis column 310 stands upright on the stand 210, parallel to a Z axis. The Z slider 320 is provided to the Z axis column 310 so as to be capable of displacement in a Z direction (up-down direction). The X arm 330 is supported on the Z slider 320 so as to be capable of advancing and retreating in an X direction. The head holder 340 is an "L" shaped member, the base end of which is attached to a forefront end of the X arm 330. The probe head 350 is attached to a forefront end of the head holder 340. The probe head 350 is a lever-type electric micrometer and is attached to the forefront end of the head holder 340. The probe head 350 includes a stylus 360, and a stylus head 361 which contacts a work piece is provided to a forefront end of the stylus 360. (The stylus head is not limited to being a contact-type stylus head, and can be any type of stylus head capable of detecting a surface of the work piece. Examples of a non-contact-type stylus head may include a capacitance-type or optical-type (chromatic point sensor) stylus head, or the like.)

Moreover, an angle of the stylus 360, an angle of inclination of the head holder 340, an amount of advance/retreat of the X arm 330, and a position (lift/lower amount) of the Z slider 320 are detected by respective encoders (not shown in the drawings).

The rotary table device 400 includes a rotary table 410 and a rotation driver 420. The rotation driver 420 is installed on the stand 210 and causes the disc-shaped rotary table 410 to rotate. Adjustment knobs 430 are provided on a side surface of the rotation driver 420 at 90° intervals in a circumferential direction. By operating the adjustment knobs 430, the fine positioning and fine tilt of the rotary table 410 in each of the X axis direction, Y axis direction, and Z axis direction can be adjusted, thus enabling the rotary table 410 to be centered and made horizontal. When the work piece is placed on the rotary table 410, the work piece rotates together with the rotary table 410.

Figure 2:
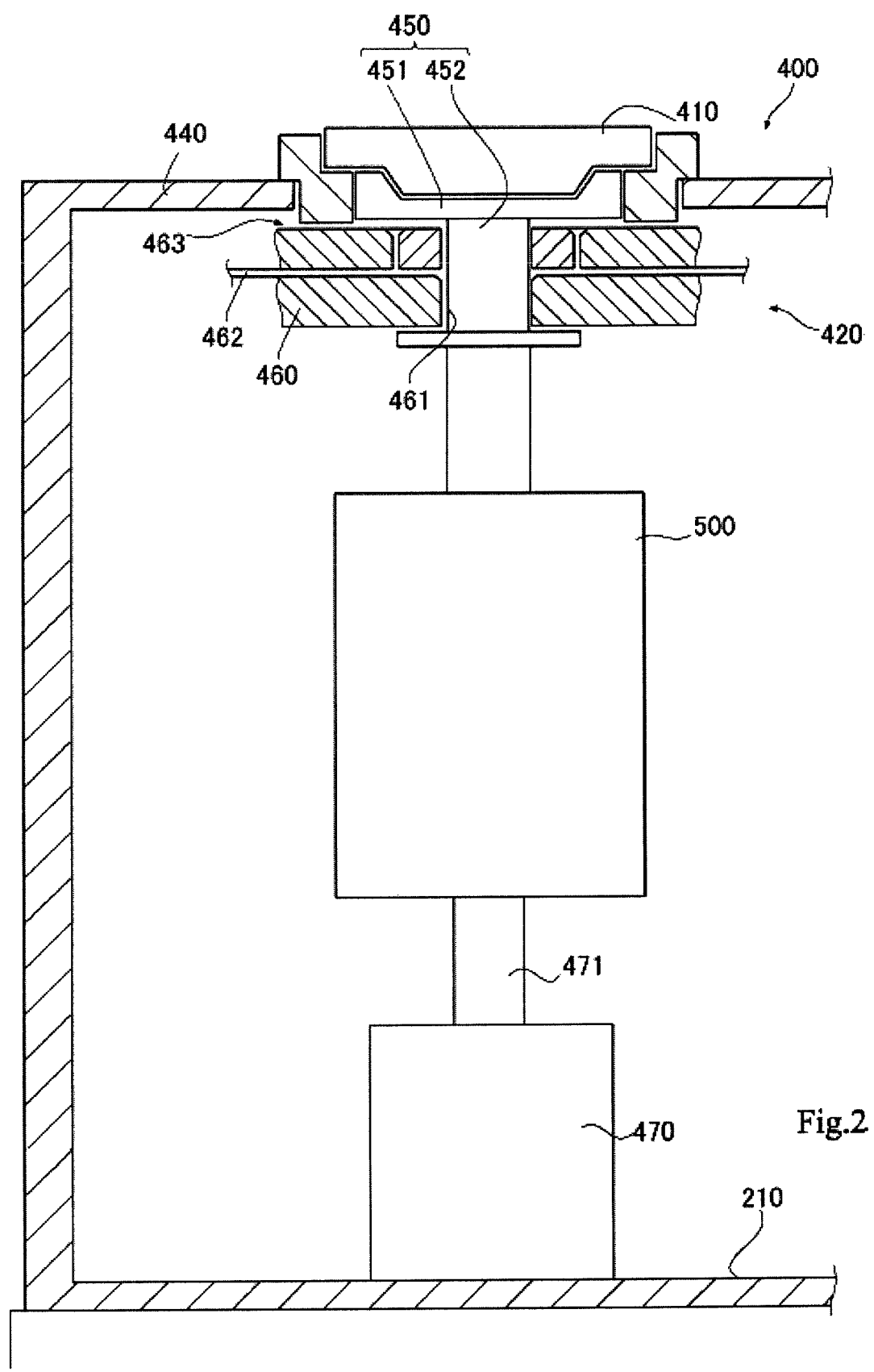
FIG. 2 is a diagram of an internal configuration of a rotary table device.

A configuration of the rotation driver 420 is now described. FIG. 2 depicts the configuration of the rotation driver 420. In the figure, a direction running up and down is labeled as the Z axis, and mutually orthogonal axes lying on a plane perpendicular to the Z axis are labeled as the X axis and Y axis, respectively.

The rotation driver 420 is housed within a housing 440 installed on the stand 210. In addition, the rotation driver 420 includes a rotor 450, a motor 470, and a shaft coupling 500.

The rotor 450 includes a rotation plate 451 and a rotor shaft 452. The rotation plate 451 has a disc-like shape, and the rotary table 410 is placed on a top surface thereof. The rotor shaft 452 extends downward in the Z direction from a bottom surface of the rotation plate 451.

The rotor 450 is supported from below by a cylindrical rotor support 460. The rotor shaft 452 is inserted through a tubular hole 461 in the rotor support 460, and the rotation plate 451 sits on a top surface of the rotor support 460. In addition, air is supplied from an air vent 462 to an area between the rotor support 460 and the rotor 450, and the rotor 450 is provided with bearing support by an air bearing 463.

The motor 470 is arranged below the rotor 450, and an output shaft 471 of the motor 470 extends in the Z axis direction. The positions of both the motor 470 and the rotor 450 are adjusted such that the motor output shaft 471 and the rotor shaft 452 are substantially coaxial. A rotary encoder (not shown in the drawings) is affixed to the motor output shaft 471.

The shaft coupling 500 is connected to the motor output shaft 471 and the rotor shaft 452. The shaft coupling 500 includes a slide mechanism (not shown in the drawings) that slides between the motor output shaft 471 and the rotor shaft 452 in the X, Y, and Z axis directions, and the shaft coupling 500 transmits rotation power from a driving shaft (motor output shaft 471) to a driven shaft (rotor shaft 452) while absorbing an offset between the motor output shaft 471 and the rotor shaft 452.

Figure 3:
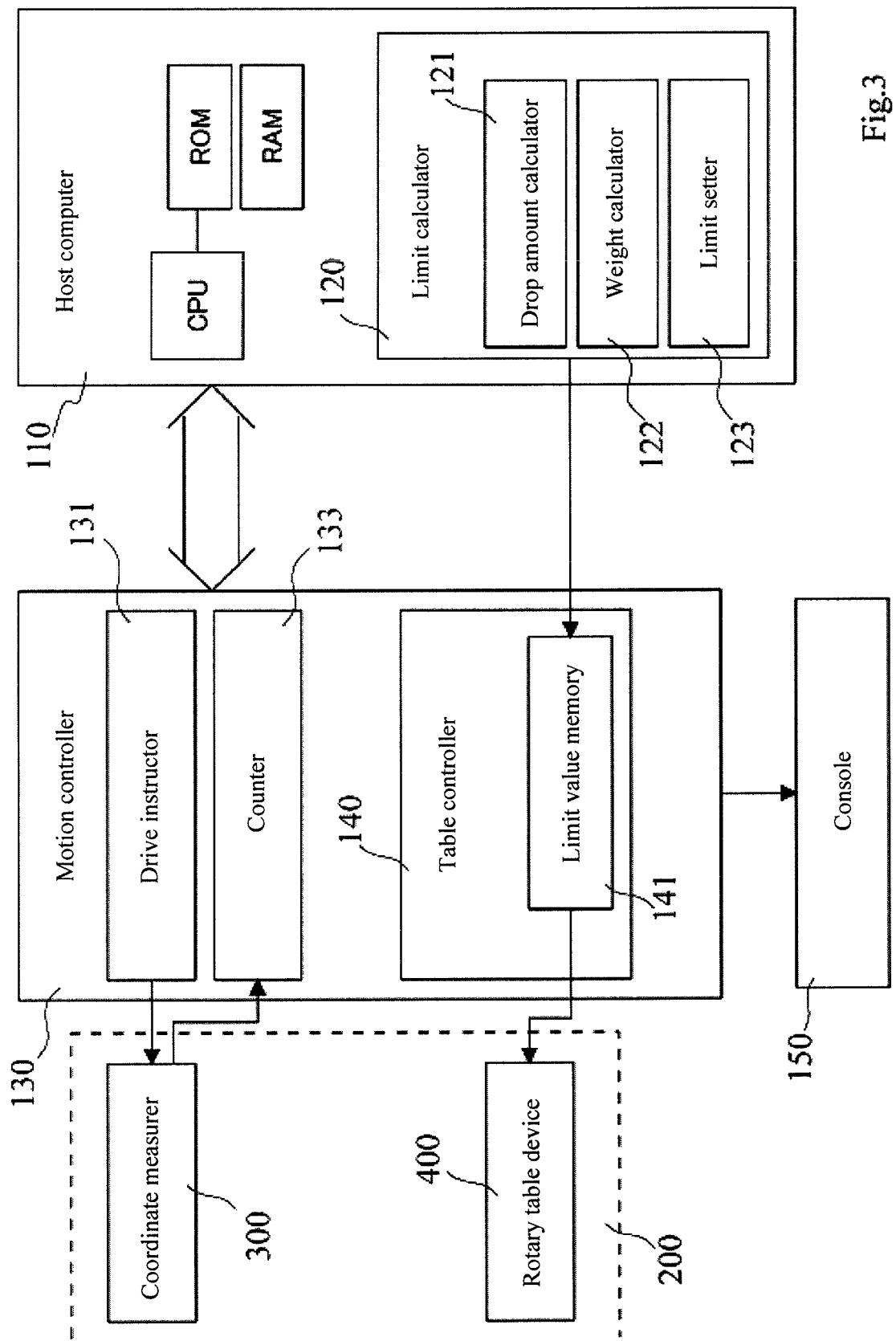
FIG. 3 is a functional block diagram of a host computer and a motion controller.

FIG. 3 is a functional block diagram of the host computer 110 and the motion controller 130. The host computer 110 is a so-called computer terminal that includes a CPU (Central Processing Unit), and a ROM and a RAM storing predetermined programs. Together with issuing a predetermined operation instruction to the motion controller 130, the host computer 110 executes a computation such as shape analysis of a work piece W (see FIG. 7) based on data obtained by the measurer main body 200. The host computer 110 further includes a limit calculator 120 that sets an upper limit on a rotation speed of the rotary table 410. The limit calculator 120 includes a drop amount calculator 121, a weight calculator 122, and a limit setter 123. The specific operations of various components are described below with reference to flow charts. The host computer 110 also provides a user with an input/output interface via a monitor, a keyboard, and a mouse.

The motion controller 130 executes drive control of the measurer main body 200 based on an instruction from the host computer 110. The motion controller 130 includes a drive instructor 131 that issues a drive instruction to the coordinate measurer 300, a table controller 140 that performs drive control of the rotary table device 400, and a counter 133 that counts detected values from encoders provided to the coordinate measurer 300 and the rotary table device 400. The table controller 140 issues a drive pulse to the motor 470 based on an instruction from the host computer 110, causing the rotor 450 to rotate. In this example, the table controller 140 includes a limit value memory 141 that stores limits for the rotation speed and acceleration/deceleration speed of the rotary table 410. The limit values stored by the limit value memory 141 are described below with reference to flow charts.

By manual operation of an operation lever or operation button provided to the console 150, an operation instruction is issued to the motion controller 130. For example, a user manually operates the lever or button and thereby adjusts the rotation speed of the rotary table 410.

Method of Setting Drive Limit of Rotary Table Device

A method of controlling the drive of the rotary table device according to the present embodiment is described with reference to the flow charts of FIGS. 4 and 5. Specifically, an upper limit value of the rotation speed of the rotary table device and an upper limit value (or lower limit value) of the acceleration speed (or deceleration speed) during acceleration/deceleration are set automatically in accordance with the work piece. The various steps of the operation described below are executed automatically by the host computer 110 reading through a parts program.

Power is supplied to start up the measurer main body 200. Once the measurer main body 200 is powered up, compressed air of a predetermined pressure is supplied to the rotary table device 400. The air is output in a jet from the air vent 462, causing the rotor 450 to float (ST110). The measurer main body 200 also acquires an origin point of the Z slider 320 and the X arm 330 and performs measurement preparations. (When absolute encoders are used, the current positions of the components are acquired at start-up.)

Figure 5:
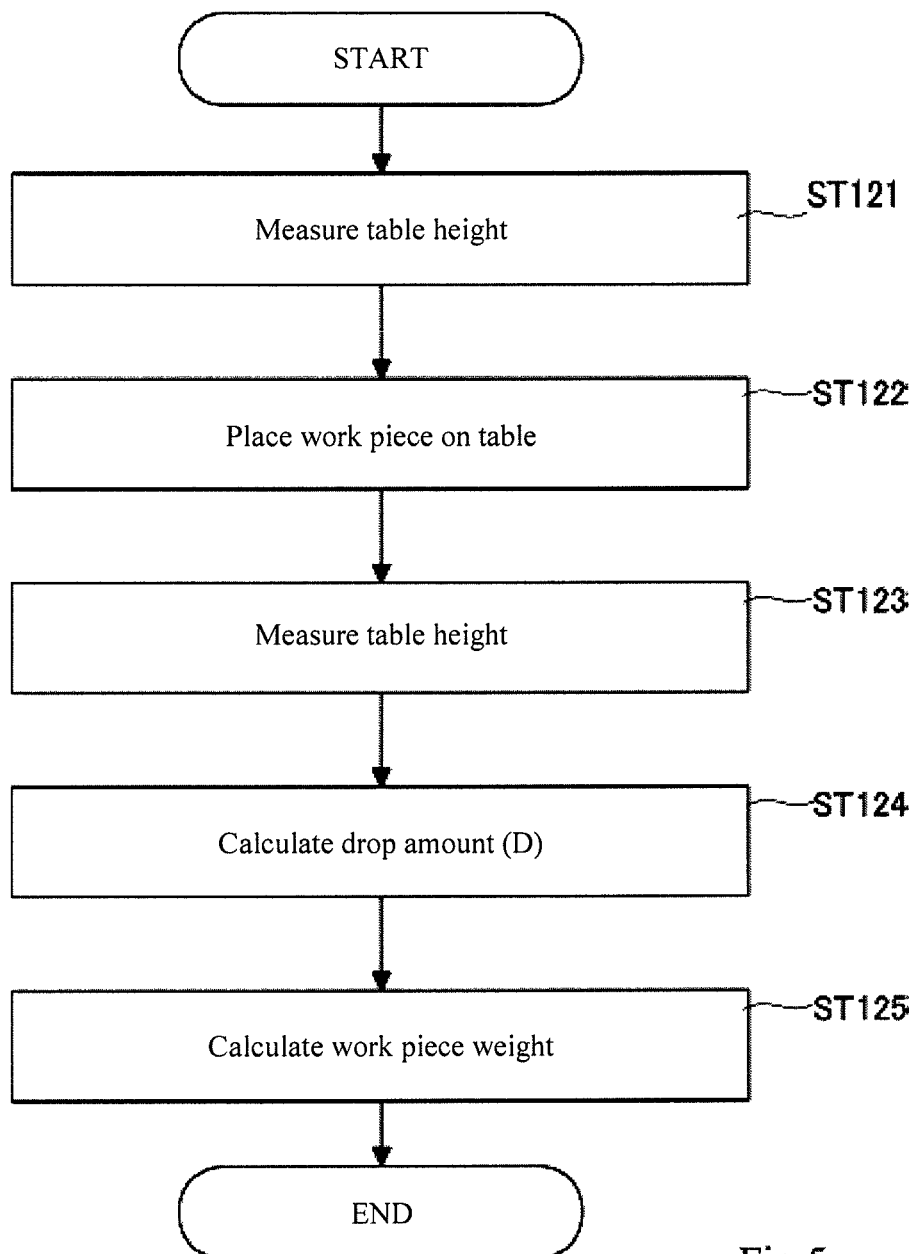
FIG. 5 is a flow chart describing the drive control method of the rotary table device.
Figure 6:
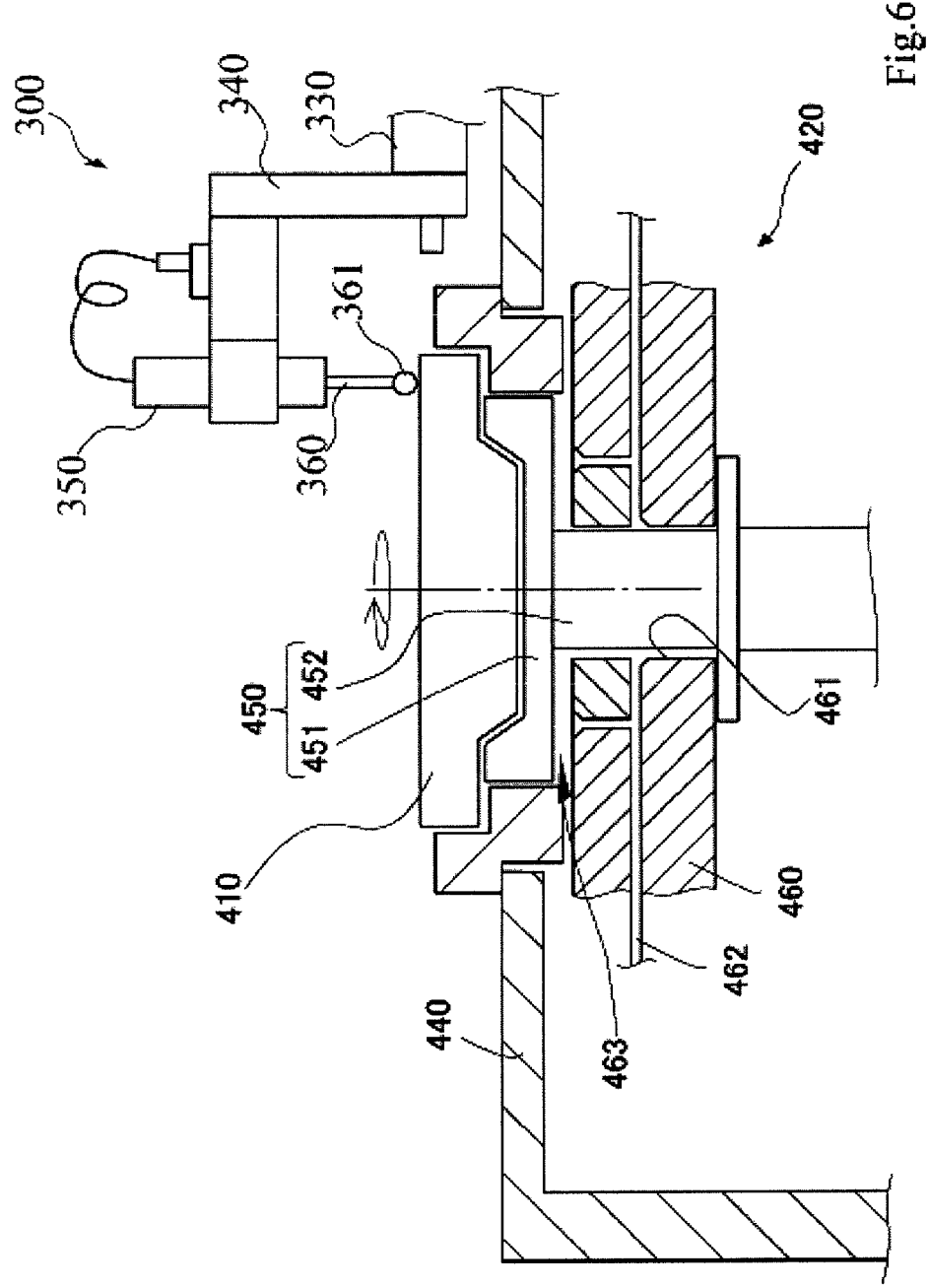
FIG. 6 is an exemplary view of a rotary table floating on air bearings in a state where no work piece is present on the rotary table.

Next, the measurer main body 200 detects the weight of the work piece (ST120). Detection of the weight of the work piece is described with reference to the flow chart of FIG. 5. At this point, the rotor 450 floats in a state where the work piece W is not on the rotary table 410 (see FIG. 6). The height of the rotary table 410 in this state (h0: first height) is measured (ST121). The measurement of the height of the rotary table 410 uses a measurement operation of the coordinate measurer 300. Specifically, the Z slider 320 may be lowered along the Z axis column 310 and the height (h0) of the Z slider 320 at the point the probe head 350 makes contact with the top surface of the rotary table 410 may be detected. The detected value (h0) is sent to the limit calculator 120 and is temporarily stored in the drop amount calculator 121.

Figure 7:
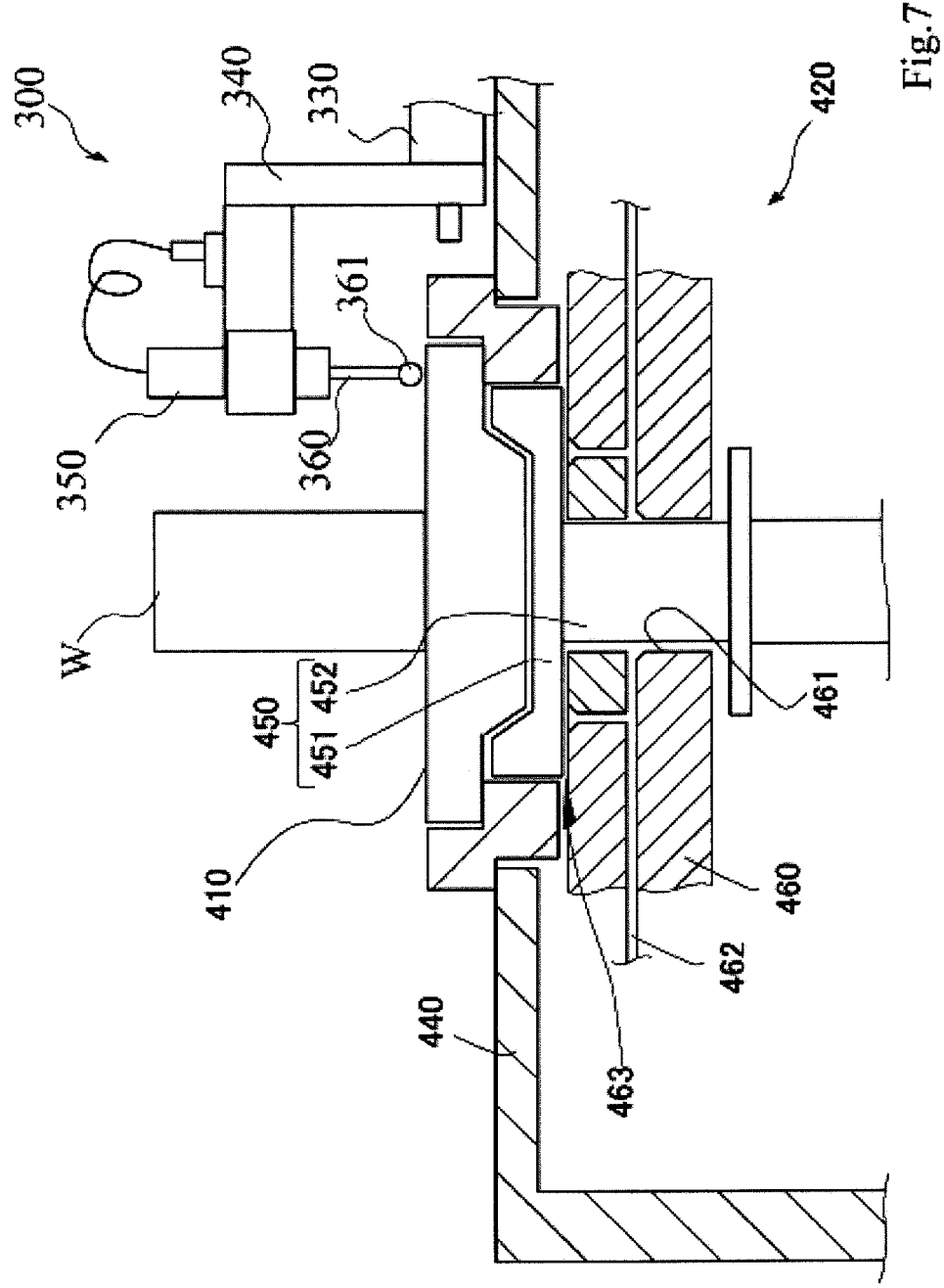
FIG. 7 illustrates an example of a state where the rotary table drops slightly due to the weight of the work piece.

Next, an operator places the work piece W on the rotary table 410 (ST122) (see FIG. 7). At this point, the weight of the work piece W bears down on the air bearing 463, changing the thickness of the layer of air, and the rotary table 410 drops slightly. The height of the rotary table 410 in this state (hw: second height) is measured (ST123). The detected value (hw) is sent to the limit calculator 120 and is temporarily stored in the drop amount calculator 121.

The limit calculator 120 calculates the weight of the work piece W based on the detected values h0 and hw. First, the drop amount calculator 121 calculates a difference (drop amount D) in the height of the table when carrying the work piece W and when the work piece W is absent.

$$D = h0 - hw$$

Figure 8:
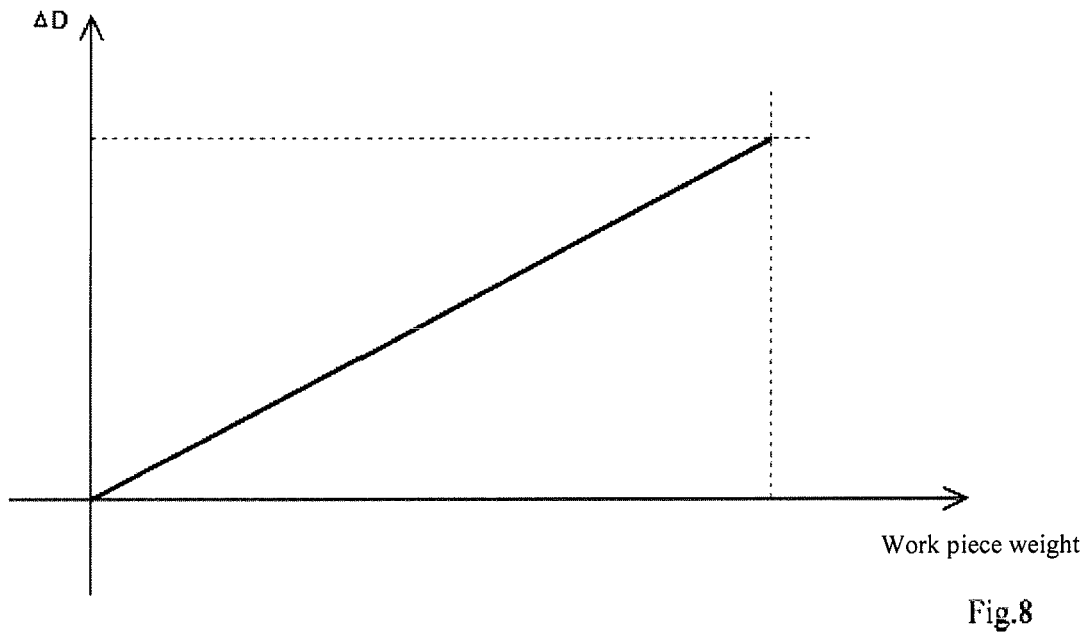
FIG. 8 illustrates an exemplary relationship between the weight of the work piece and an amount by which the rotary table drops.
Figure 9:
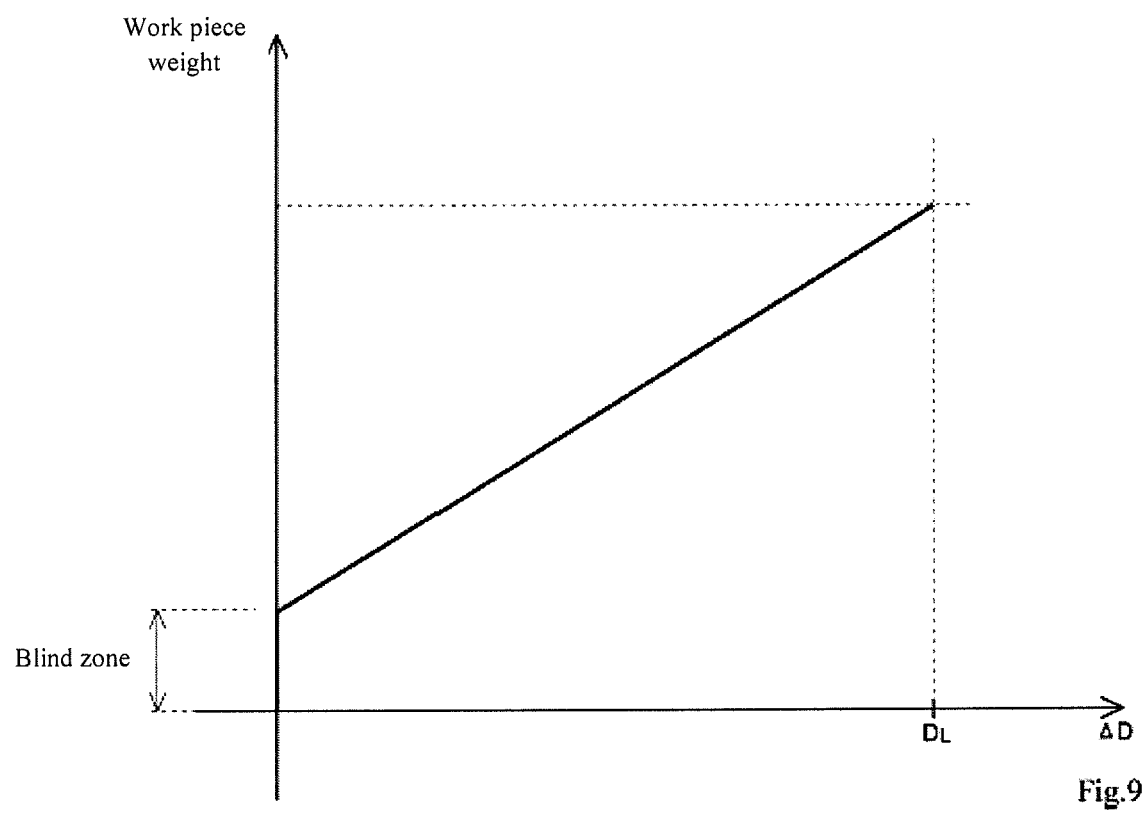
FIG. 9 illustrates an exemplary relationship between the weight of the work piece and an amount by which the rotary table drops.

Next, the weight calculator 122 uses the drop amount D to find a work piece weight Mw. In this example, when the air pressure of the air bearing 463 is constant, the thickness of the air layer of the air bearing 463 changes in response to the weight Mw of the work piece W placed on the rotary table 410. In other words, when the air pressure of the air bearing 463 is fixed at a predetermined value, the relationship between the work piece weight Mw and the drop amount D can be expressed as illustrated in the graph of FIG. 8, for example. The relationship shown in FIG. 9 between the drop amount D and the work piece weight Mw is prepared as a graph, table, or relational expression and is stored in the weight calculator 122.

The weight calculator 122 uses the drop amount D calculated in ST124 to calculate the work piece weight Mw (ST125). The work piece weight Mw found in this way is sent to the limit setter 123.

The limit setter 123 sets and stores a work piece weight limit, a rotation speed limit, an acceleration speed limit, and a deceleration speed limit ahead of time. The work piece weight limit refers to the maximum load capacity of the rotary table device 400. A work piece W that exceeds the work piece weight limit cannot be placed on the rotary table 410. The rotation speed limit, the acceleration speed limit, and the deceleration speed limit are defined in accordance with the work piece weight Mw. For example, when the work piece W is light, the rotary table 410 may be rotated quickly and may have a high acceleration/deceleration speed. Conversely, when the work piece W is heavy, the rotary table 410 must be rotated slowly to avoid damaging the rotary table device 400. The relationship shown in FIG. 10 between the work piece weight Mw and the rotation speed limit is prepared as a graph, table, or relational expression and is stored in the limit setter 123 ahead of time. Similarly, the relationship shown in FIG. 11 between the work piece weight Mw and the acceleration speed limit (or deceleration speed limit) is prepared in as a graph, table, or relational expression, and is stored in the limit setter 123 ahead of time.

Figure 4:
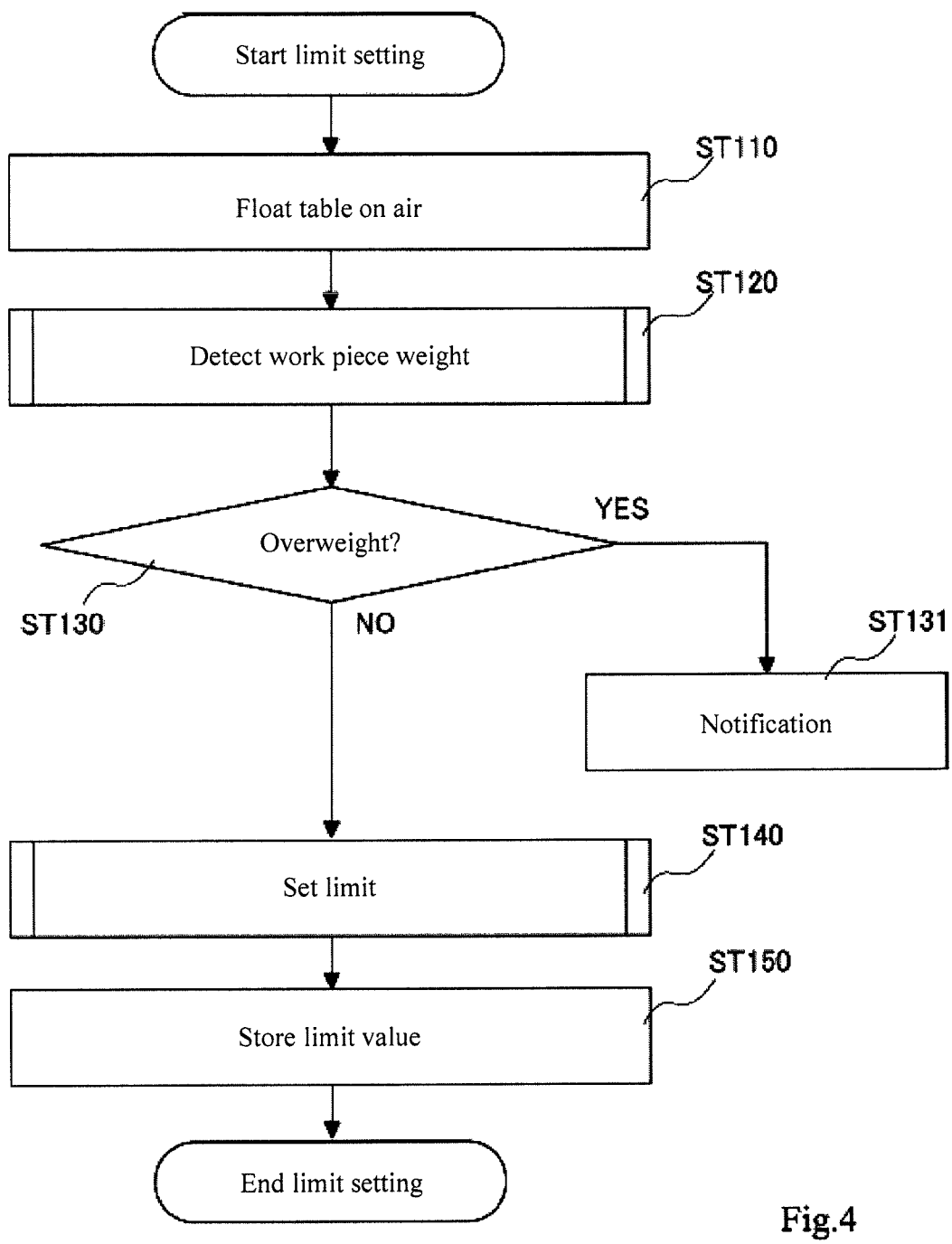
FIG. 4 is a flow chart describing a drive control method of the rotary table device.

Returning to the flow chart of FIG. 4, the limit setter 123 compares the calculated work piece weight Mw with a work piece weight limit Mmax and determines whether the work piece W is overweight (exceeds the limit value) (ST130), and issues a warning notification when the work piece W is overweight (ST131). When the work piece weight Mw is equal to or less than the work piece weight limit Mmax (ST130: NO), the limit setter 123 determines a rotation speed limit Vw, an acceleration speed limit Aw, and a deceleration speed limit that correspond to the work piece weight Mw (ST140). (In this example, the deceleration speed limit has the same magnitude as the acceleration speed limit Aw, but with the opposite mathematical sign.) The limit values Vw and Aw set by the limit setter 123 are stored in the limit value memory 141 of the table controller 140 (ST150).

In this way, the upper limit value of the rotation speed and the upper limit value of the acceleration speed (or lower limit value of the deceleration speed) of the rotary table 410 are set in accordance with the work piece W. Then, the roundness measuring device 100 measures the shape of the work piece W while rotating the work piece W with the rotary table 410. At this point, the table controller 140 ensures that the rotation speed or acceleration speed of the rotary table 410 does not exceed the set limit value. For example, the user may manipulate the rotation of the rotary table 410 as desired with a manual operation of the console. However, even in such a case, the table controller 140 ensures that the rotation speed of the rotary table 410 does not exceed the set limit value. This automatically protects the rotary table device 400 from damage.

During the shape measurement of the work piece W, the table controller 140 ensures that the rotary table device 400 is rotationally driven using the set limit value. For example, when the work piece W is light, the rotary table 410 is accordingly rotated at a high acceleration speed and rapid rotation speed. The efficiency of the shape measurement is thus improved.

After the operator places the work piece W on the rotary table 410, a centering operation is performed that makes automatic adjustments such that an axis center of the work piece (rotating body) is vertical and matches the center of rotation. However, the centering must be performed after the limit setting described above. When the centering is performed before the limit setting, although the work piece W by itself is vertical, the surface of the rotary table 410 may be tilted by the work piece W, and therefore the drop amount D cannot be measured accurately.

First Modification

Figure 11:
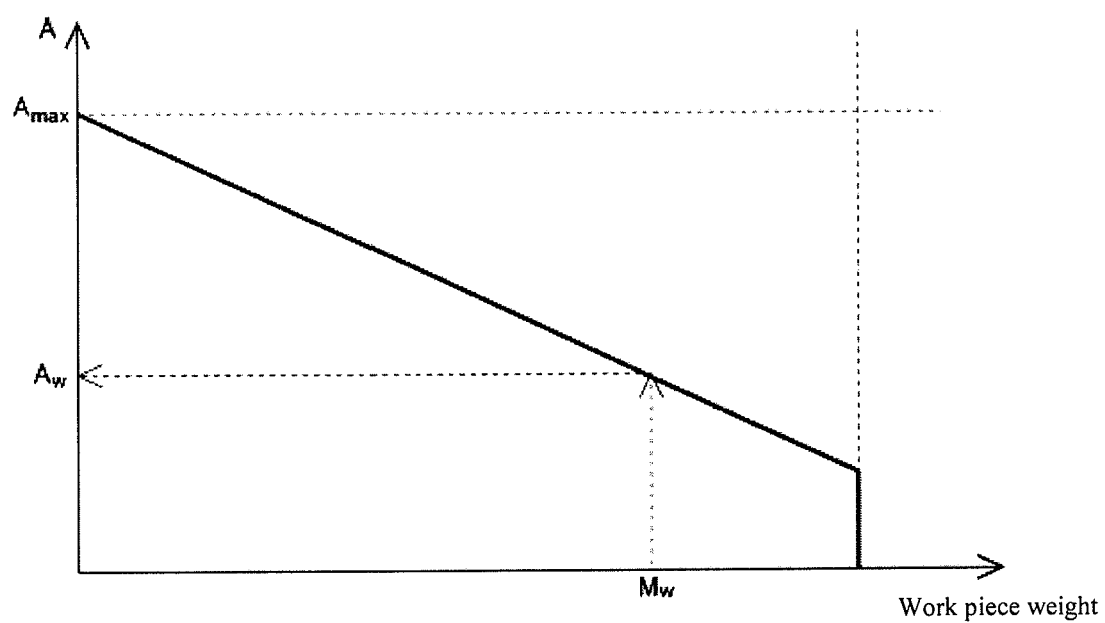
FIG. 11 illustrates an exemplary relationship between the weight of the work piece and an acceleration speed limit (or deceleration speed limit)
Figure 12:
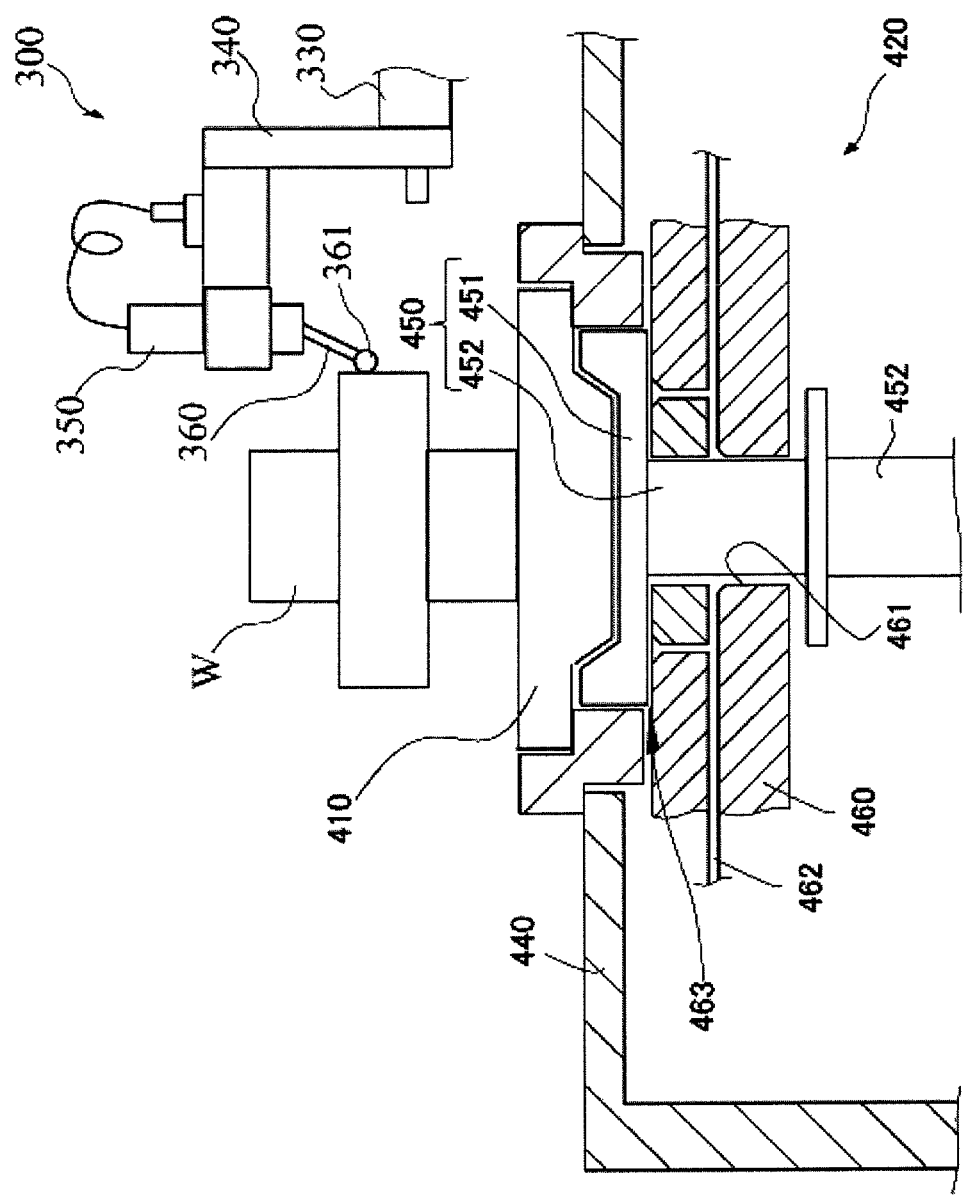
FIG. 12 is an exemplary view of detecting a diameter of the work piece.

In the embodiment described above, the work piece weight is calculated from the drop amount D of the rotary table 410, and a rotation speed and acceleration/deceleration speed that correspond to the work piece weight are found as limit values. In an exemplary modification, a rotation speed and acceleration/deceleration speed that correspond to a moment of inertia Iw of the work piece W may be found as the limit values. For example, as illustrated in FIG. 12, a diameter (for example, a maximum diameter) of the work piece W is measured ahead of time, then the moment of inertia Iw of the work piece W is roughly calculated using the measured diameter and the weight of the work piece W calculated as described in the embodiment above. Then limit values of the rotation speed and acceleration/deceleration speed are set in accordance with the calculated moment of inertia Iw. (For example, in FIGS. 10 and 11, the work piece weight may be read as the moment of inertia.)

Moreover, the diameter of the work piece W may instead be measured automatically or manually using a measurement operation of the coordinate measurer 300. Also, because the value does not need to be extremely precise, the operator may instead input the value via an input device (for example, a keyboard).

Second Modification

In the description of the embodiment given above, the coordinate measurer 300 is installed in the measuring device (roundness measuring device). Therefore, the drop amount of the rotary table is detected (measured) using a measurement operation of the coordinate measurer 300. However, a measuring apparatus that measures the drop amount of the rotary table separately from the measurement operation of the coordinate measurer may be added to the rotary table device. For example, a strain gage or scale may be incorporated into the rotary table device and detect the drop amount of the rotary table. However, because a feature of the present invention is to appropriately control the drive speed of the rotary table, the work piece weight does not need to be detected with a high degree of accuracy. Detection accuracy of the work piece weight may be in units of kilograms or tens of kilograms, for example. Therefore, rather than providing a separate, specialized weight sensor, a coordinate measuring operation that is normally provided to a shape measuring device can be used to detect the drop amount of the rotary table.

Third Modification

Figure 13:
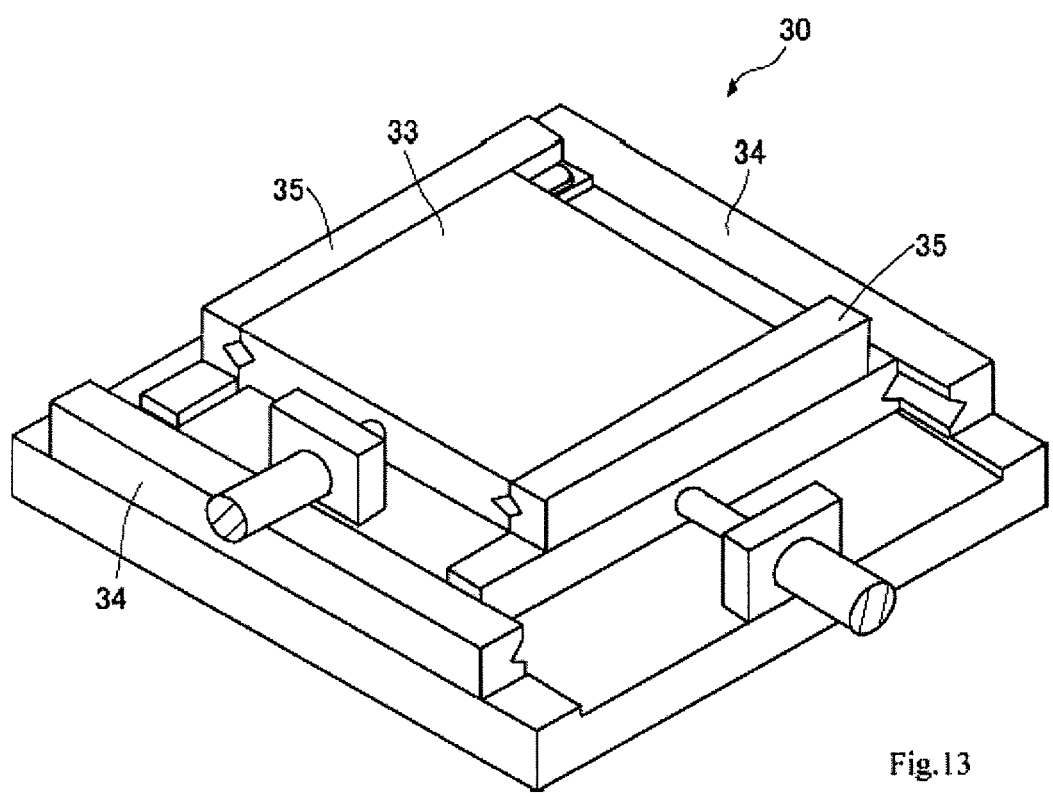
FIG. 13 illustrates an exemplary movable stage device.

The embodiment above is described using the rotation speed of the rotary table device as an example. However, a movable stage device 30 as illustrated in FIG. 13 is another example of a drive stage. The movable stage device 30 performs two-dimensional sliding displacement of a movable stage 33 via an X drive shaft 35 and a Y drive shaft 34. An air bearing is used in order to displace the movable stage 33 smoothly during sliding displacement. Similar to the embodiment described above, a drop amount of the movable stage 33 is detected both when a work piece is present and when no work piece is present, the work piece weight is calculated from the drop amount, and a displacement speed and acceleration/deceleration speed corresponding to the work piece weight are calculated. The drive control of the movable stage device 30 is performed in accordance with the weight of the work piece, and therefore, as in the embodiment described above, measurement efficiency can be improved.

Figure 10:
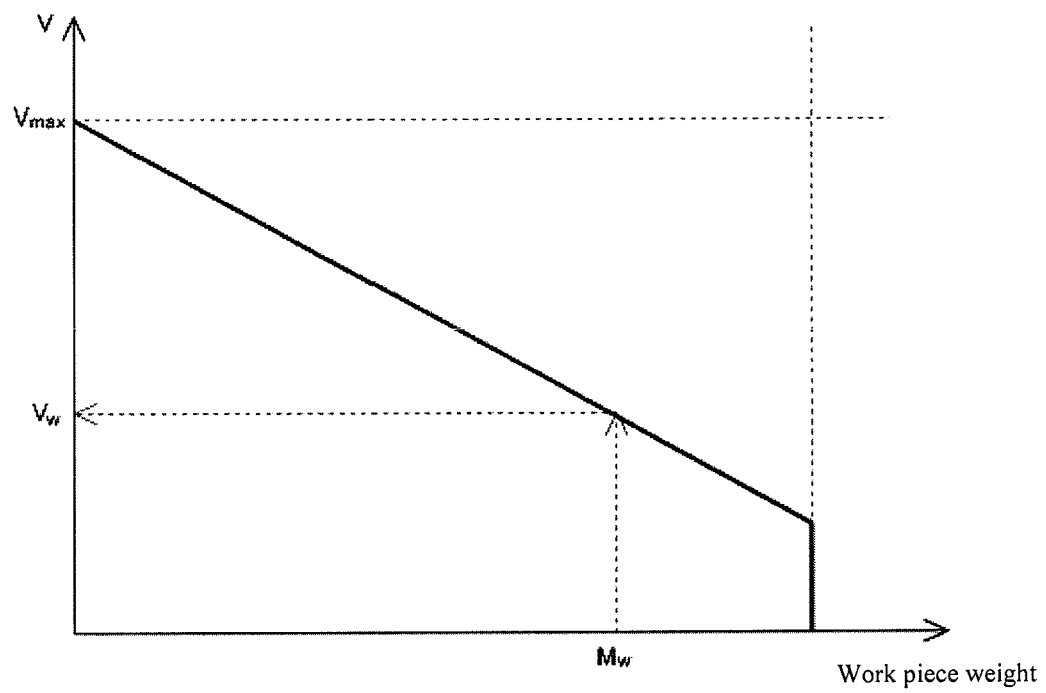
FIG. 10 illustrates an exemplary relationship between the weight of the work piece and a rotation speed limit.

Moreover, the present invention is not limited to the embodiment described above, and may be modified as needed without departing from the scope of the present invention. FIGS. 10 and 11 illustrate an example where the upper limit speed and upper limit acceleration speed are defined by a linear function, decreasing monotonically with respect to the work piece weight. However, this is merely exemplary. When the upper limit speed and upper limit acceleration speed are defined relative to the work piece weight, the curve may of course be either upwardly or downwardly convex.

In the embodiment above, an example is described where both the speed of the rotary table (movable stage) and the acceleration/deceleration speed are restricted. Of course, instead, only one of the speed and the acceleration/deceleration speed may be restricted to correspond with the work piece weight (or moment of inertia).

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A control method of a drive stage device comprising:
   causing a stage to float on an air bearing;
   measuring, as a first height, a height of the stage while floating on the air bearing;
   placing a work piece on the stage;
   measuring, as a second height, a height of the stage when the stage is holding the work piece;
   calculating, as a drop amount, a difference between the first height and the second height;
   calculating a weight of the work piece based on the drop amount;
   determining an upper limit speed of one of rotational drive and horizontal movement of the stage based on the calculated work piece weight; and
   controlling a speed of the one of the rotational drive and the horizontal movement of the stage so as to not exceed the upper limit speed.

2. A control method of a drive stage device comprising:
   causing a stage to float on an air bearing;
   measuring, as a first height, a height of the stage while floating on the air bearing;
   placing a work piece on the stage;
   measuring, as a second height, a height of the stage when the stage is holding the work piece;
   calculating, as a drop amount, a difference between the first height and the second height;
   calculating a weight of the work piece based on the drop amount;
   determining one of an acceleration speed limit and a deceleration speed limit of one of rotational drive and horizontal movement of the stage based on the calculated work piece weight; and
   controlling the one of the acceleration speed and the deceleration speed of the one of the rotational drive and the horizontal movement of the stage so as to not exceed the limit.

3. The control method of the drive stage device according to claim 1, wherein:
   the calculated weight of the work piece is compared with a maximum load capacity of the drive stage device, and
   when the calculated weight of the work piece exceeds the maximum load capacity, a warning notification is issued.

4. The control method of the drive stage device according to claim 2, wherein:
   the calculated weight of the work piece is compared with a maximum load capacity of the drive stage device, and
   when the calculated weight of the work piece exceeds the maximum load capacity, a warning notification is issued.

5. A control method of a shape measuring device provided with a rotary table device having a rotary table that rotates while holding a work piece, and a coordinate measurer detecting a surface of the work piece and measuring a shape of the work piece, the control method comprising:
   causing the rotary table to float on an air bearing;
   measuring, as a first height, a height of the rotary table while floating on the air bearing;
   placing the work piece on the rotary table;
   measuring, as a second height, a height of the rotary table when the rotary table is holding the work piece;
   calculating, as a drop amount, a difference between the first height and the second height;
   calculating a weight of the work piece based on the drop amount;
   determining an upper limit of a rotation speed of the rotary table based on the calculated work piece weight; and
   measuring, with the coordinate measurer, the shape of the work piece resting on the rotary table while controlling the rotation speed of the rotary table so as to not exceed the upper limit.

6. A control method of a shape measuring device provided with a rotary table device having a rotary table that rotates while holding a work piece, and a coordinate measurer detecting a surface of the work piece and measuring a shape of the work piece, the control method comprising:
   causing the rotary table to float on an air bearing;
   measuring, as a first height, a height of the rotary table while floating on the air bearing;
   placing the work piece on the rotary table;

measuring, as a second height, a height of the rotary table when the rotary table is holding the work piece;

calculating, as a drop amount, a difference between the first height and the second height;

calculating a weight of the work piece based on the drop amount;

determining one of an acceleration speed limit and a deceleration speed limit of rotation of the rotary table based on the calculated work piece weight; and measuring, with the coordinate measurer, the shape of the work piece resting on the rotary table while controlling the one of the acceleration speed and the deceleration speed of the rotation of the rotary table so as to not exceed the limit.

7. The control method of the shape measuring device according to claim 5, further comprising:

calculating a moment of inertia of the work piece based on a diameter and a weight of the work piece, and determining the upper limit of the rotation speed of the rotary table based on the moment of inertia of the work piece.

8. The control method of the shape measuring device according to claim 6, further comprising:

calculating a moment of inertia of the work piece based on a diameter and a weight of the work piece, and determining the limit of the one of the acceleration speed and the deceleration speed of the rotation of the rotary table based on the moment of inertia of the work piece.

9. The control method of the shape measuring device according to claim 5, further comprising centering the rotary table device after measuring the second height.

10. The control method of the shape measuring device according to claim 6, further comprising centering the rotary table device after measuring the second height.

11. The control method of the shape measuring device according to claim 7, further comprising centering the rotary table device after measuring the second height.

12. The control method of the shape measuring device according to claim 8, further comprising centering the rotary table device after measuring the second height.

* * * * *